(12) United States Patent
Kamura et al.

(10) Patent No.: US 8,642,718 B2
(45) Date of Patent: Feb. 4, 2014

(54) CURABLE COMPOSITION

(75) Inventors: Teruo Kamura, Tokyo (JP); Motoharu Takeuchi, Tokyo (JP); Masahiro Johno, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 306 days.

(21) Appl. No.: 11/912,929

(22) PCT Filed: May 18, 2006

(86) PCT No.: PCT/JP2006/309907
§ 371 (c)(1),
(2), (4) Date: Oct. 29, 2007

(87) PCT Pub. No.: WO2006/123731
PCT Pub. Date: Nov. 23, 2006

(65) Prior Publication Data
US 2009/0018308 A1    Jan. 15, 2009

(30) Foreign Application Priority Data

May 19, 2005 (JP) ................. 2005-147390
May 19, 2005 (JP) ................. 2005-147392

(51) Int. Cl.
*C08G 75/04* (2006.01)
(52) U.S. Cl.
USPC ........................................ 528/375
(58) Field of Classification Search
USPC ........................................ 528/375
See application file for complete search history.

(56) References Cited

U.S. PATENT DOCUMENTS

| 5,153,277 | A  | * | 10/1992 | Awaji et al. .................. 525/502 |
| 5,955,206 | A  | * | 9/1999 | Okazaki et al. ............. 428/542.8 |
| 2004/0122201 | A1 | * | 6/2004 | Yoshimura et al. ............. 528/44 |
| 2004/0254258 | A1 | * | 12/2004 | Horikoshi et al. ............. 523/102 |
| 2005/0062932 | A1 |  | 3/2005 | Kosaka et al. |

FOREIGN PATENT DOCUMENTS

| JP | 2004-197005 | 7/2004 |
| JP | 2004-269673 | 9/2004 |
| JP | 2004-315556 | 11/2004 |
| JP | 2004-339329 | 12/2004 |

\* cited by examiner

*Primary Examiner* — Shane Fang
(74) *Attorney, Agent, or Firm* — Antonelli, Terry, Stout & Kraus, LLP.

(57) ABSTRACT

A curable composition containing an inorganic compound A having sulfur atom and/or selenium atom, a compound B represented by the following formula 1:

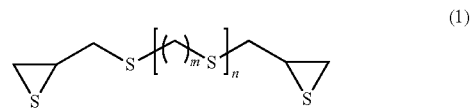

(1)

wherein m is an integer from 0 to 4, and n is an integer from 0 to 2,
and a compound C selected from the group consisting of disulfide compounds which are other than the compound B and have one or more disulfide linkages Inorganic compound A is contained in an amount from 1 to 50 parts by weight and compound B is contained in an amount from 50 to 99 parts by weight when a total of inorganic compound A and compound B is taken as 100 parts by weight. Compound C is contained in an amount from 1 to 20 parts by weight based on 100 parts by weight in total of inorganic compound A and compound B.

22 Claims, 1 Drawing Sheet

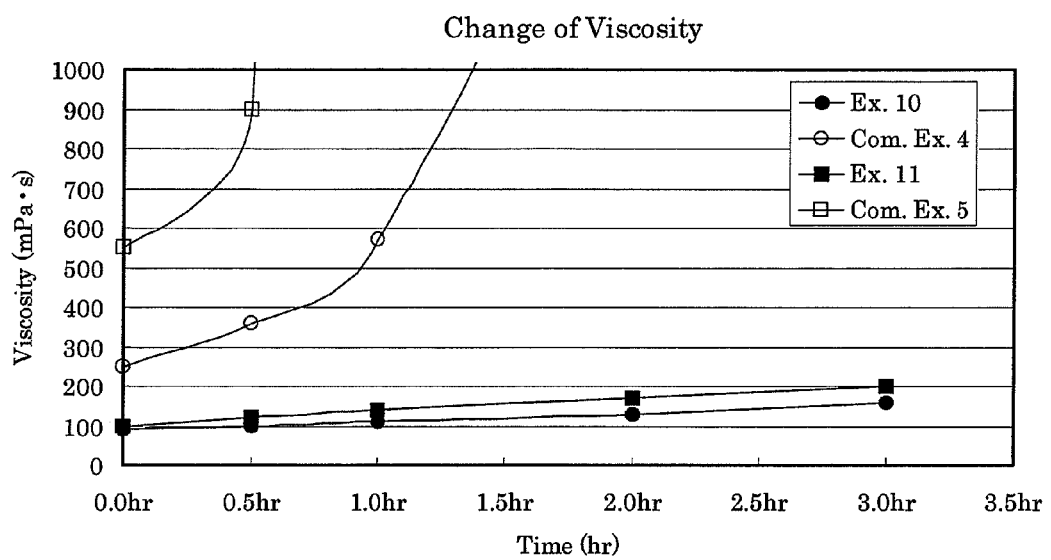

CURABLE COMPOSITION

TECHNICAL FIELD

The present invention relates to curable compositions containing an inorganic compound having sulfur atom and/or selenium atom, and further relates to optical materials having a high refractive index and Abbe number which are obtained by curing the compositions by polymerization. The optical materials of the present invention are useful as optical products such as plastic lenses, prisms, optical fibers, information recording media, filters, and adhesives, particularly as spectacle lenses.

BACKGROUND ART

Plastic materials have been now widely used in the production of various optical materials, particularly, spectacle lenses because of their light weight, good toughness and easiness of dyeing. The important properties required for optical materials, especially, spectacle lenses are high refractive index and high Abbe number. A high refractive index reduces the thickness of lenses, and a high Abbe number reduces the chromatic aberration of lenses. To achieve a high refractive index and a high Abbe number simultaneously, various polyepisulfide compounds which are well balanced in the refractive index and the Abbe number are recently reported (Patent Documents 1 to 3). The optical materials produced from the polyepisulfide compounds proposed in these patent documents attain a refractive index of 1.7 or higher and a high Abbe number. However, materials having a still higher refractive index have been demanded.

To meet such a demand by achieving a still higher refractive index, proposed is an optical material produced by the use of an inorganic compound having sulfur atom and/or selenium atom (Patent Document 4). To make the resultant optical material highly transparent, a prepolymerization reaction and a deaeration treatment are required in the preparation of a composition containing such an inorganic compound (Patent Documents 5 and 6). However, the prepolymerization and the deaeration increase the viscosity of the composition. Particularly, the viscosity increases drastically when an increased amount of the inorganic compound having sulfur atom and/or selenium atom is used to increase the refractive index. Therefore, the operations for cast polymerization such as filtration and casting into a mold become difficult to perform.

[Patent Document 1] JP 9-71580A
[Patent Document 2] JP 9-110979A
[Patent Document 3] JP 9-255781A
[Patent Document 4] JP 2001-2783A
[Patent Document 5] JP 2004-197005A
[Patent Document 6] JP 2004-137481A

DISCLOSURE OF INVENTION

An object of the present invention is to provide a composition containing an inorganic compound having sulfur atom and/or selenium atom for producing an optical material having a high refractive index, which causes little increase in the viscosity even when subjected to prepolymerization and deaeration, thereby making the operations of cast polymerization easy.

After the extensive research in view of achieving the above object, the inventors have found compositions which exhibit a low viscosity even after the prepolymerization and the deaeration and make the operations of cast polymerization easy. The invention is based on this finding.

Thus, the present invention relates to a curable composition containing an inorganic compound A having sulfur atom and/or selenium atom, a compound B represented by the following formula 1:

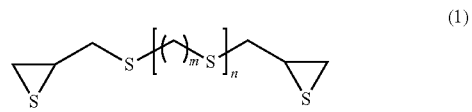

wherein m is an integer from 0 to 4, and n is an integer from 0 to 2,
and a compound C selected from the group consisting of thiol compounds having one SH group and disulfide compounds which are other than the compound B and have one or more disulfide linkages, the inorganic compound A being contained in an amount from 1 to 50 parts by weight and the compound B being contained in an amount from 50 to 99 parts by weight when a total of the inorganic compound A and the compound B is taken as 100 parts by weight, and the compound C being contained in an amount from 1 to 20 parts by weight based on 100 parts by weight in total of the inorganic compound A and the compound B.

BRIEF DESCRIPTION OF DRAWINGS

FIG. 1 is a graph showing the viscosity immediately after the deaeration and the change of viscosity thereafter (Examples 10-11 and Comparative Examples 4-5).

BEST MODE FOR CARRYING OUT THE INVENTION

The curable composition of the present invention contains, as the basic ingredients, the inorganic compound A, the compound B and the compound C.

The inorganic compound A many be any of inorganic compounds having at least one sulfur atom and/or selenium atom. The inorganic compounds referred herein are as defined in "Dictionary for Standard Chemical Terms" compiled by The Chemical Society of Japan, 1991, Maruzen. In the present invention, elementary sulfur is included in the inorganic compound A for convenience. The total content of sulfur atom and selenium atom in the inorganic compound A is preferably 30% by weight or more (inclusive of 100%). If less than 30% by weight, the effect of improving the refractive index of resultant optical materials is reduced because of the insufficient amounts of sulfur atom and selenium atom. Letting the total of the inorganic compound A and the compound B be 100 parts by weight, the content of the inorganic compound A in the curable composition is from 1 to 50 parts by weight, preferably from 5 to 50 parts by weight, more preferably from 10 to 40 parts by weight, still more preferably from 15 to 35 parts by weight, and particularly preferably from 20 to 30 parts by weight.

Examples of the inorganic compound A having sulfur atom or both of sulfur atom and selenium atom include sulfur, hydrogen sulfide, carbon disulfide, carbon selenosulfide, ammonium sulfide, sulfur oxides such as sulfur oxide and sulfur trioxide, salts of thiocarbonic acid, sulfuric acid and its salts, hydrogensulfates, salts of sulfurous acid, salts of hyposulfurous acid, salts of persulfuric acid, salts of thiocyanic acid, salts of thiosulfuric acid, halides such as sulfur dichloride, thionyl chloride and thiophosgene, boron sulfide, nitrogen sulfide, silicon sulfide, phosphorus sulfide, arsenic sulfide, metal sulfides, and metal hydrogensulfides, with sulfur, carbon disulfide, phosphorus sulfide, selenium sulfide, metal sulfides and metal hydrogensulfides being preferred, and sulfur, carbon disulfide and selenium sulfide being more preferred.

Examples of the inorganic compound A having selenium atom, but having no sulfur atom include selenium, hydrogen selenide, selenium dioxide, carbon diselenide, ammonium selenide, selenium oxides such as selenium dioxide, selenic acid and its salts, selenious acid and its salts, hydrogenselenates, selenosulfuric acid and its salts, selenopyrosulfuric acid and its salts, halides such as selenium tetrabromide and selenium oxychloride, salts of selenocyanic acid, boron selenide, phosphorus selenide, arsenic selenide, and metal selenidse, with selenium, carbon diselenide, phosphorus selenide and metal selenides being preferred, and selenium and carbon diselenide being more preferred.

These inorganic compounds A having sulfur atom and/or selenium atom may be used alone or in combination of two or more.

Letting the total of the inorganic compound A and the compound B be 100 parts by weight, the content of the compound B in the curable composition is from 50 to 99 parts by weight, preferably from 50 to 95 parts by weight, more preferably from 60 to 90 parts by weight, still more preferably from 65 to 85 parts by weight, and particularly preferably from 70 to 80 parts by weight.

Examples of the compound B include episulfide compounds such as bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane, and bis(β-epithiopropylthioethyl)sulfide. The compound B may be used alone or in combination of two or more. Preferred are bis(β-epithiopropyl)sulfide and bis(β-epithiopropyl)disulfide, and more preferred is bis(β-epithiopropyl)sulfide.

It has been found that the addition of at least one compound C selected from the group consisting of thiol compounds having one SH group and disulfide compounds which are other than compound B and have one or more disulfide linkages is effective for preventing the composition containing the inorganic compound A and the compound B from increasing its viscosity and for producing an optical material with a low yellowness from such a composition. The compounds having two or more SH groups which are proposed in Patent Document 6, etc. cannot prevent the increase of the viscosity caused by the prepolymerization and the deaeration. The content of the compound C in the curable composition is from 1 to 20 parts by weight, preferably from 2 to 18 parts by weight, more preferably from 3 to 15 parts by weight, still more preferably from 4 to 12 parts by weight, and particularly preferably from 5 to 10 parts by weight, each based on 100 parts by weight in total of the inorganic compound A and the compound B.

It has been further found that the compound C having a specific structure is effective for attaining a high refractive index and a low yellowness of the resultant optical material, also considering its easy handling. Namely, it is preferred for obtaining an optical material having a high refractive index that the compound C has an aromatic ring (inclusive of non-benzenoid aromatic ring). To obtain an optical material having a low yellowness, the molecular weight of the thiol compound having one SH group is preferably 200 or less, and preferably 100 or more because it is in a liquid or solid state with little odor and easy-to-handle. To obtain an optical material having a low yellowness, the molecular weight of the disulfide compound other than compound B is preferably 300 or less, and preferably 150 or more because it is in a liquid or solid state with little odor and easy-to-handle.

Examples of the thiol compounds having one SH group include methyl mercaptan, ethyl mercaptan, n-propyl mercaptan, n-butyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, isopropyl mercaptan, t-butyl mercaptan, t-nonyl mercaptan, t-dodecyl mercaptan, allyl mercaptan, 2-mercaptoethanol, 2-(2-mercaptoethylthio)ethanol, 3-mercapto-1,2-propanediol, 2-mercapto-1,3-propanediol, mercaptoacetic acid, mercaptoglycolic acid, mercaptopropionic acid, methyl mercaptoglycolate, methyl mercaptopropionate, methyl (2-mercaptoethylthoacetate), methyl (2-mercaptoethylthiopropionate), 2-dimethylaminoethanethiol, 2-diethylaminoethanethiol, 2-dibutylaminoethanethiol, 2-(1-pyrrolidinyl)ethanethiol, 2-(1-piperidinyl)ethanethiol, 2-(4-morpholinyl)ethanethiol, 2-(N-methylanilino)ethanethiol, 2-(N-ethylanilino)ethanethiol, 2-(2-mercaptoethylmethylamino)ethanethiol, cyclopentyl mercaptan, cyclohexyl mercaptan, mercapto-1,4-dithiane, mercaptomethyl-1,4-dithiane, mercaptoethylthiomethyl-1,4-dithiane, thiophenol, 4-hydroxythiophenol, 2-methylthiophenol, 3-methylthiophenol, 4-methylthiophenol, 4-t-butylthiophenol, 2,4-dimethylthiophenol, 2,5-dimethylthiophenol, 3-methoxythiophenol, 4-methoxythiophenol, 5-t-butyl-2-methylthiophenol, 2-chlorothiophenol, 3-chlorothiophenol, 4-chlorothiophenol, 2,5-dichlorothiophenol, 3,4-dichlorothiophenol, 2,3-dichlorothiophenol, 2,6-dichlorothiophenol, 3,5-dichlorothiophenol, 2,4-dichlorothiophenol, 2,4,5-trichlorothiophenol, pentachlorothiophenol, 2-amino-4-chlorothiophenol, 2-bromothiophenol, 3-bromothiophenol, 4-bromothiophenol, 4-nitrothiophenol, 2-aminothiophenol, 3-aminothiophenol, 4-aminothiophenol, benzyl mercaptan, 4-methoxybenzyl mercaptan, 4-chlorobenzyl mercaptan, 2,4-dichlorobenzyl mercaptan, 4-bromobenzyl mercaptan, 3-vinylbenzyl mercaptan, 4-vinylbenzyl mercaptan, 2-phenylthioethanethiol, 2-benzylthioethanethiol, 2-mercaptonaphthalene, 1-mercaptofuran, 2-mercaptofuran, 1-mercaptomethylfuran, 2-mercaptomethylfuran, 1-mercaptothiophene, 2-mercaptothiophene, 1-mercaptomethylthiophene, 2-mercaptomethylthiophene, 2-mercaptopyridine, 4-mercaptopyridine, 2-mercaptobiphenyl, 4-mercaptobiphenyl, and mercaptobenzoic acid, with 1-mercaptomethylfuran, 2-mercaptoethanol, cyclohexyl mercaptan and thiol compounds having aromatic ring being preferred, the thiol compounds having aromatic ring such as thiophenol, 2-methylthiophenol, 3-methylthiophenol, 4-methylthiophenol, benzyl mercaptan, and 4-chlorobenzyl mercaptan being more preferred, and benzyl mercaptan being still more preferred.

Examples of the disulfide compounds other than compound B include dimethyl disulfide, diethyl disulfide, di-n-propyl disulfide, di-n-butyl disulfide, di-n-hexyl disulfide, di-n-octyl disulfide, di-n-decyl disulfide, di-n-dodecyl disulfide, diisopropyl disulfide, di-t-butyl disulfide, diallyl disulfide, bis(2-hydroxyethyl)disulfide, bis(3-carboxypropyl)disulfide, dicyclohexyl disulfide, diphenyl disulfide, di-p-tolyl disulfide, bis(chlorophenyl)disulfide, bis(2,4,5-trichlorodiphenyl)disulfide, dinaphthyl disulfide, bis(6-hydroxy-2-naphthyl)disulfide, difurfuryl disulfide, dipyridyl disulfide, dithiodimorpholine, and tetra-n-butylthiuram disulfide, with disulfide compounds having aromatic ring being preferred, diphenyl disulfide, di-p-tolyl disulfide, bis(chlorophenyl)disulfide, dinaphthyl disulfide, difurfuryl disulfide, and dipyridyl disulfide being more preferred, and diphenyl disulfide being still more preferred.

The compound C may be used alone or in combination of two or more.

In the present invention, it is preferred to prepolymerize the inorganic compound A and the compound B partly or entirely, because the handing of the solid inorganic compound A becomes easy and an optical material with a good transparency is obtained. The prepolymerization can be performed in the presence of a catalyst. The catalyst for the prepolymerization is selected from the compounds which will be mentioned below as the catalysts for polymerization, with the compounds having nitrogen or phosphorus atom being preferred, and the compounds having nitrogen or phosphorus atom and further having unsaturated bond being more preferred. Still more preferred are imidazole compounds and particularly preferred is 2-mercapto-1-methylimidazole. The amount of the catalyst for prepolymerization to be added is preferably from 0.001 to 5 parts by weight, more preferably from 0.002 to 5 parts by weight, and still more preferably from 0.005 to 3 parts by weight each based on the 100 parts by weight in total of the inorganic compound A and the compound B.

The prepolymerization of the inorganic compound A and the compound B is described below in detail. The inorganic compound A and the compound B are maintained at prepolymerization temperatures for a given period of time under or without stirring in the presence of a catalyst for prepolymerization. The prepolymerization time is preferably from 1 min to 72 h, more preferably from 10 min to 48 h, and still more preferably from 30 min to 24 h. The prepolymerization temperature is preferably from 0 to 150° C., more preferably from 10 to 120° C., and still more preferably from 20 to 100° C. The prepolymerization is continued preferably until from 10 to 70% by weight, more preferably until from 20 to 60% by weight of the inorganic compound A which is initially charged is prepolymerized. The prepolymerization may be performed in air or atmosphere containing gas such as nitrogen and oxygen in an open or closed manner under atmospheric pressure, reduced pressure of applied pressure. The prepolymerization can be performed in the presence of the compound C in part or entirety of the amount to be blended, the catalyst for polymerization or additives such as a polymerization regulator, the performance improver which will be described below and ultraviolet absorber. To obtain a uniform composition by controlling the progress of prepolymerization, it is preferred to analyze the reaction mixture by liquid chromatography (determination of the amount of prepolymerized inorganic compound A) and measure the viscosity, specific gravity, refractive index, etc. The liquid-chromatographic analysis and the measurement of refractive index are preferably employed because of their high sensitivity, with the measurement of refractive index being more preferred because of its easiness. In the measurement of refractive index, an in-line refractometer is preferably used because the progress of prepolymerization can be monitored in real time. The prepolymerization can be finished without casing the curing by polymerization even when carried out in the presence of the catalyst for polymerization, if the prepolymerization is terminated, for example, at the time when the refractive index of the reaction system reaches about 1.65 (20° C.).

To obtain a highly transparent optical material, it is preferred to deaerate the composition in advance of the polymerization for curing. The deaeration is carried out under reduced pressure before, during or after, preferably during or after mixing the performance improver, the catalyst for polymerization, the polymerization regulator and other additives. The degree of vacuum is preferably from 0.001 to 50 Torr, more preferably from 0.005 to 25 Torr, and still more preferably from 0.01 to 10 Torr. The degree of vacuum may be varied within the above range during the deaeration. The deaeration time is preferably from 1 min to 24 h, more preferably from 5 min to 18 h, and still more preferably from 10 min to 12 h. The deaeration temperature is preferably from 0 to 100° C., more preferably from 5 to 80° C., and still more preferably from 10 to 60° C., which may be varied within the above range. To enhance the effect of deaeration, it is preferred to continuously renew the surface of the composition which is exposed to the surrounding atmosphere by stirring the composition, blowing a gas into the composition or applying ultrasonic vibration during the deaeration. By the deaeration, the dissolved gases such as hydrogen sulfide and the low-boiling substances such as low molecular weight mercaptan are mainly removed from the composition.

The viscosity of the composition is not particularly limited as far as the cast polymerization can be easily operated, and preferably 150 mPa·s or lower, and more preferably 100 mPa·s or lower. Generally, the cast polymerization can be easily operated when the viscosity is 150 mPa·s or lower. If exceeding 150 mPa·s, the operation (filtration) of cast polymerization becomes difficult, and becomes impossible if exceeding 400 mPa·s. Since the casting operation requires about three hours in industrial productions, it is preferred that the viscosity of composition does not increase within such a period of time.

The viscosities referred to above are values obtained by the measurement at 20° C. immediately after the deaeration which follows the prepolymerization. As described in the examples, the prepolymerization of the inorganic compound A and the compound B is carried out until the refractive index of the reaction system reaches 1.67 to 1.69 (20° C.), and then, the deaeration is carried out under 10 Torr for 30 min at 20° C.

The curable composition of the invention is cured by polymerization optionally in the presence of a catalyst for polymerization. Examples of the catalysts for polymerization include amines, phosphines, quaternary ammonium salts, quaternary phosphonium salts, condensates of aldehyde and amine, ammonium carboxylates, urethanes, thiourethanes, guanidines, thioureas, thiazoles, sulfenamides, thiurams, salts of dithiocarbamic acid, salts of xanthic acid, tertirary sulfonium salts, secondary iodonium salts, mineral acids, Lewis acids, organic acids, silisic acids, tetrafluoroboric acids, peroxides, azo compounds, and acid phosphoric esters. Representative examples thereof are described below.

(1) Amines:

primary amines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenethylamine, α-phenylethylamine, naphthylamine, and furfurylamine;

primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis(3-aminopropyl)ether, 1,2-bis(3-aminopropoxy)ethane, 1,3-bis(3-aminopropoxy)-2,2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperazine, o-, m-, or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5.5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethylpiperazine), 1,4-bis(aminopropylpiperazine), 2,6-diaminopyridine, and bis(3,4-diaminophenyl)sulfone;

secondary amines such as diethylamine, dipropylamine, di-n-butylamine, di-sec-butylamine, diisobutylamine, di-n-pentylamine, di-3-pentylamine, dihexylamine, octylamine, di(2-ethylhexyl)amine, methylhexylamine, diallylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrole, indoline, indole, and morpholine;

secondary polyamines such as N,N'-dimethylethylene-diamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylene diamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homopiperazine, 1,1-di(4-piperidyl)methane, 1,2-di(4-piperidyl)ethane, 1,3-di(4-piperidyl)propane, 1,4-di(4-piperidyl)butane, and tetramethylguanidine;

tertiary amines such as trimethylamine, triethylamine, tri-n-propylamine, triisopropylamine, tri-1,2-dimethylpropylamine, tri-3-methoxypropylamine, tri-n-butylamine, triisobutylamine, tri-sec-butylamine, tripentylamine, tri-3-pentylamine, tri-n-hexylamine, tri-n-octylamine, tri-2-ethylhexylamine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, 2-(2-dimethylaminoethoxy)-4-methyl-1,3,2-dioxabornane;

tertiary polyamines such as tetramethylethylene diamine, pyrazine, N,N'-dimethylpiperazine, N,N'-bis((2-hydroxy)propyl)piperazine, hexamethylenetetramine, N,N,N',N'-tetramethyl-1,3-butaneamine, 2-dimethylamino-2-hydroxypropane, diethylaminoethanol, N,N,N-tris(3-dimethylaminopropyl)amine, 2,4,6-tris(N,N-dimethylaminomethyl)phenol, and heptamethylisobiguanide;

imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis(2-ethyl-4-methylimidazolyl)methane, 2-mercaptoimidazole, 2-mercapto-1-methylimidazole, 2-mercaptobenzoimidazole, 3-mercapto-4-methyl-4H-1,2,4-triazole, 5-mercapto-1-methyltetrazole, 2,5-dimercapto-1,3,4-thiadiazole, adducts of alkylimidazole and isocyanuric acid, and condensates of alkylimidazole and formaldehyde;

pyrazoles such as 3,5-dimethylpyrazole, 3,5-di(2-pyridyl)pyrazole, 3,5-dimethyl-1-hydroxymethylpyrazole, 3,5-diisopropylpyrazole, 3,5-dimethyl-1-phenylpyrazole, 3-methylpyrazole, 4-methylpyrazole, N-methylpyrazole, and 5-thienylpyrazole; and amidines such as 1,8-diazabicyclo[5.4.0]undecene-7,1,5-diazabicyclo[4.3.0]nonene-5, and 6-dibutylamino-1,8-diazabicyclo[5.4-0]undecene-7.

(2) Phosphines:

trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, and chlorodiphenylphosphine.

(3) Quaternary Ammonium Salts:

tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium paratoluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethyldodecylammonium chloride, trimethylcetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyldimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpyridinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide 1-benzylpicolinium chloride, and 1-benzylpicolinium bromide.

(4) Quaternary Phosphonium Salts:
tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakis(hydroxymethyl)phosphonium chloride, tetrakis(hydroxymethyl)phosphonium bromide, tetrakis(hydroxyethyl)phosphonium chloride, and tetrakis(hydroxybutyl)phosphonium chloride.

(5) Condensates of Aldehyde and Amine:
reaction products of acetaldehyde and ammonia, condensates of formaldehyde and p-toluidine, condensates of acetaldehyde and p-toluidine, reaction products of formaldehyde and aniline, reaction products of acetaldehyde and aniline, reaction products of butylaldehyde and aniline, reaction products of formaldehyde, acetaldehyde and aniline, reaction products of acetaldehyde, butylaldehyde and aniline, condensates of butylaldehyde and monomonobutylamine, reaction products of butylaldehyde and butylideneaniline, reaction products of heptaldehyde and aniline, reaction products of tricrotonilidene and tetramine, condensates of α-ethyl-β-propylacrolein and aniline, and condensates of formaldehyde and alkylimidazole.

(6) Ammonium Carboxylates:
ammonium acetate, ammonium benzoate, ammonium carbamate, and ammonium trifluoroacetate.

(7) Urethanes:
urethanes produced by the reaction of alcohol and isocyanate.

(8) Thiourethanes:
thiourethanes produced by the reaction of mercaptan and isocyanate.

(9) Guanidines:
diphenylguanidine, phenyltolylguanidine, phenylxylylguanidine, tolylxylylguanidine, di-o-tolylguanidine, o-tolylguanide, diphenylguanidine phthalate, tetramethylguanidine, guanidine thiocyanate, triphenylguanidine, aminoguanidine sulfate, 1,3-diphenylguanidine sulfate, and di-o-tolylguanidine salts of dicatechol boric acid.

(10) Thioureas:
thiocarboanilide, di-o-tolylthiourea, ethylenethiourea, diethylthiourea, dibutylthiourea, dilaurylthiourea, trimethylthiourea, dimethylethylthiourea, tetramethylthiourea, 1,3-diphenyl-2-thiourea, 1-allyl-2-thiourea, and guanylthiourea.

(11) Thiazoles:
2-mercaptobenzothiazole, dibenzothiazyl disulfide, cyclohexylamine salt of 2-mercaptobenzothiazole, 2-(2,4-dinitrophenylthio)benzothiazole, 2-(morpholinodithio)benzothiazole, 2-(2,6-dimethyl-4-morpholinothio)benzothiazole, N,N-diethylthiocarbamoyl-2-benzothiazolyl sulfide, 1,3-bis(2-benzothiazolylmercaptomethyl)urea, benzothiadiazyl thiobenzoate, 2-mercaptothiazoline, 2-mercapto-5-methyl-1,3,4-thiadiazole, 2-mercapto-5-methylthio-1,3,4-thiadiazole, 2-(morpholinothio)benzothiazole, sodium salt of 2-mercaptobenzothiazole, zinc salt of 2-mercaptobenzothiazole, and complex salts of dibenzothiazyl disulfide and zinc chloride.

(12) Sulfenamides:
N-cyclohexyl-2-benzothiazyl sulfenamide, N-tert-butyl-2-benzothiazyl sulfenamide, N-tert-octyl-2-benzothiazyl sulfenamide, N-oxydiethylene-2-benzothiazyl sulfenamide, N,N-diethyl-2-benzothiazyl sulfenamide, N,N-diisopropyl-2-benzothiazyl sulfenamide, and N,N-dicyclohexyl-2-benzothiazyl sulfonamide.

(13) Thiurams:
tetramethylthiuram monosulfide, tetraethylthiuram monosulfide, tetrabutylthiuram monosulfide, dipentamethylenethiuram monosulfide, tetramethylthiuram disulfide, tetraethylthiuram disulfide, tetrabutylthiuram disulfide, N,N'-dimethyl-N,N'-diphenylthiuram disulfide, N,N'-diethyl-N,N'-diphenylthiuram disulfide, dipentamethylenethiuram disulfide, dipentamethylenethiuram tetrasulfide, and cyclic thiuram.

(14) Salts of Dithiocarbamic Acid:
sodium dimethyldithiocarbamate, sodium diethyldithiocarbamate, sodium dibutyldithiocarbamate, sodium pentamethylenedithiocarbamate, sodium cyclohexylethyldithiocarbamate, potassium dimethyldithiocarbamate, lead dimethyldithiocarbamate, zinc dimethyldithiocarbamate, zinc diethyldithiocarbamate, zinc dibutyldithiocarbamate, zinc diphenyldithiocarbamate, zinc dibenzyldithiocarbamate, zinc pentamethylenedithiocarbamate, zinc dimethylpentamethylenedithiocarbamate, zinc ethylphenyldithiocarbamate, bismuth dimethyldithiocarbamate, cadmium diethyldithiocarbamate, cadmium pentamethylenedithiocarbamate, selenium dimethyldithiocarbamate, selenium diethyldithiocarbamate, tellurium dimethyldithiocarbamate, tellurium diethyldithiocarbamate, iron dimethyldithiocarbamate, copper dimethyldithiocarbamate, diethylammonium diethyldithiocarbamate, N,N-cyclohexylammonium dibutyldithiocarbamate, piperidine pentamethylenedithiocarbamate, sodium cyclohexylethylammonium cyclohexylethyldithiocarbamate, pipecoline methylpentamethylenedithiocarbamate, pipecolinium pipecolyldithiocarbamate, zinc N-phenyldithiocarbamate, and complex compounds of zinc pentamethylenedithiocarbamate and piperidine.

(15) Salts of Xanthic Acid:
sodium isopropylxanthate, zinc isopropylxanthate, zinc butylxanthate, and dibutylxanthic acid disulfide.

(16) Tertiary Sulfonium Salts:
trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide, and triphenylsulfonium iodide.

(17) Secondary Iodonium Salts:
diphenyliodonium chloride, diphenyliodonium bromide, and diphenyliodonium iodide.

(18) Mineral Acids:
hydrochloric acid, sulfuric acid, nitric acid, phosphoric acid, carbonic acid, and half esters thereof.

(19) Lewis Acids:
boron trifluoride and etherate of boron trifluoride.

(20) Organic Acids and Half Esters Thereof

(21) Silicic Acid and Tetrafluoroboric Acid

(22) Peroxides:
cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, tert-hexyl peroxyneodecanoate, tert-butyl peroxyneodecanoate, tert-hexyl peroxyneohexanoate, tert-butyl peroxyneohexanoate, 2,4-dichlorobenzoyl peroxide, benzoyl peroxide, dicumyl peroxide, di-tert-butyl peroxide, cumene hydroperoxide, and tert-butyl hydroperoxide.

(23) Azo Compounds:
2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2-methylpropane), and 2,2'-azobis(2,4,4-trimethylpentane).

(24) Acid Phosphoric Esters:
mono- or dimethyl phosphate, mono- or diethyl phosphate, mono- or dipropyl phosphate, mono- or dibutyl phosphate, mono- or dihexyl phosphate, mono- or dioctyl phosphate, mono- or didecyl phosphate, mono- or didodecyl phosphate, mono- or diphenyl phosphate, mono- or dibenzyl phosphate, and mono- or didecanol phosphate.

The catalyst for polymerization is not limited to the compounds recited above as far as the curing by polymerization of the curable composition is catalyzed. The above compounds may be used alone or in combination of two or more as the catalyst for polymerization. Of the above compounds, preferred are quaternary ammonium salts such as tetra-n-butylammonium bromide, triethylbenzylammonium chloride, cetyldimethylbenzylammonium chloride, and 1-n-dodecylpyridinium chloride, and quaternary phosphonium salts such as tetra-n-butylphosphonium bromide and tetraphenylphosphonium bromide, with triethylbenzylammonium chloride and tetra-n-butylphosphonium bromide being more preferred, and tetra-n-butylphosphonium bromide being still more preferred.

The amount of the catalyst for polymerization to be used is preferably from 0.001 to 5 parts by weight, more preferably from 0.002 to 5 parts by weight, and still more preferably from 0.005 to 3 parts by weight, each being based on 100 parts by weight in total of the inorganic compound A and compound B.

To prolong the pot life and disperse the polymerization heat, a polymerization regulator is optionally added during the polymerization for curing. Examples of the polymerization regulator include halides of elements in the groups 13 to 16 of the long periodic table. Representative examples thereof are described below.

(1) Silane Halides:
silicon tetrachloride, methyltrichlorosilane, dimethyldichlorosilane, trimethylchlorosilane, ethyltrichlorosilane, diethyldichlorosilane, triethylchlorosilane, propyltrichlorosilane, dipropyldichlorosilane, tripropylchlorosilane, n-butyltrichlorosilane, di-n-butyldichlorosilane, tri-n-butylchlorosilane, t-butyltrichlorosilane, di-t-butyldichlorosilane, tri-t-butylchlorosilane, octyltrichlorosilane, dioctyldichlorosilane, trioctylchlorosilane, phenyltrichlorosilane, diphenyldichlorosilane, triphenylchlorosilane, allylchlorodimethylsilane, trichloroallylsilane, t-butylchlorodimethylsilane, diphenyl-t-butylchlorosilane, t-butoxychlorodiphenylsilane, trimethyl(2-chloroallyl)silane, trimethylchloromethylsilane, and n-butylchlorodimethylsilane.

(2) Germanium Halides:
germanium tetrachloride, methylgermanium trichloride, dimethylgermanium dichloride, trimethylgermanium chloride, ethylgermanium trichloride, diethylgermanium dichloride, triethylgermanium chloride, propylgermanium trichloride, dipropylgermanium dichloride, tripropylgermanium chloride, n-butylgermanium trichloride, di-n-butylgermanium dichloride, tri-n-butylgermanium chloride, t-butylgermanium trichloride, di-t-butylgermanium dichloride, tri-t-butylgermanium chloride, amylgermanium trichloride, diamylgermanium dichloride, triamylgermanium chloride, octylgermanium trichloride, dioctylgermanium dichloride, trioctylgermanium chloride, phenylgermanium trichloride, diphenylgermanium dichloride, triphenylgermanium chloride, tolylgermanium trichloride, ditolylgermanium dichloride, tritolylgermanium chloride, benzylgermanium trichloride, dibenzylgermanium dichloride, tribenzylgermanium chloride, cyclohexylgermanium trichloride, dicyclohexylgermanium dichloride, tricyclohexylgermanium chloride, vinylgermanium trichloride, divinylgermanium dichloride, trivinylgermanium chloride, allyltrichlorogermane, bis(chloromethyl)dimethylgermane, chloromethyltrichlorogermane, t-butyldimethylchlorogermane, carboxyethyltrichlorogermane, chloromethyltrimethylgermane, dichloromethyltrimethylgermane, 3-chloropropyltrichlorogermane, phenyldimethylchlorogermane, and 3-(trichlorogermyl)propionyl chloride.

(3) Tin Halides:
tin tetrachloride, diethyltin dichloride, dimethyltin dichloride, trimethyltin chloride, ethyltin trichloride, diethyltin dichloride, triethyltin chloride, propyltin trichloride, dipropyltin dichloride, tripropyltin chloride, n-butyltin trichloride, di-n-butyltin dichloride, tri-n-butyltin chloride, t-butyltin trichloride, di-t-butyltin dichloride, tri-t-butyltin chloride, amyltin trichloride, diamyltin dichloride, triamyltin chloride, octyltin trichloride, dioctyltin dichloride, trioctyltin chloride, phenyltin trichloride, diphenyltin dichloride, triphenyltin chloride, tolyltin trichloride, ditolyltin dichloride, tritolyltin chloride, benzyltin trichloride, dibenzyltin dichloride, tribenzyltin chloride, cyclohexyltin trichloride, dicyclohexyltin dichloride, tricyclohexyltin chloride, vinyltin trichloride, divinyltin dichloride, trivinyltin chloride, butylchlorodihydroxytin, bis(2,4-pentadionato)dichlorotin, carbomethoxyethyltrichlorotin, chloromethyltrimethyltin, diallyldichlorotin, dibutylbutoxychlorotin, and tri-n-pentylchlorotin.

(4) Antimony Halides:

antimony pentachloride, methylantimony tetrachloride, dimethylantimony trichloride, trimethylantimony dichloride, tetramethylantimony chloride, ethylantimony tetrachloride, diethylantimony trichloride, triethylantimony dichloride, tetraethylantimony chloride, butylantimony tetrachloride, dibutylantimony trichloride, tributylantimony dichloride, tetrabutylantimony chloride, phenylantimony tetrachloride, diphenylantimony trichloride, triphenylantimony dichloride, and tetraphenylantimony chloride.

(5) Other Halides:

halides such as aluminum chloride, indium chloride, thallium chloride, phosphorus trichloride, phosphorus pentachloride, and bismuth chloride;

compounds having halogen and hydrocarbon group such as diphenylchlorobron, phenyldichlorobron, diethylchlorogallium, dimethylchloroindium, diethylchlorothallium, diphenylchlorothallium, ethyldichlorophosphine, butyldichlorophosphine, triphenylphosphine dichloride, diphenylchloroarsenic, tetraphenylchloroarsenic, diphenyldichloroselenium, phenylchloroselenium, and diphenyldichlorotellurium;

compounds having halogenated hydrocarbon group such as chlorophenol, dichlorophenol, trichlorophenol, chloroaniline, dichloroaniline, chloronitrobenzene, dichloronitrobenzene, chlorobenzene, dichlorobenzene, trichlorobenzene, chloroacetophenone, chlorotoluene, chloronitroaniline, chlorobenzyl cyanide, chlorobenzaldehyde, chlorobenzotrichloride, chloronaphthalene, dichloronaphthalene, chlorothiophenol, dichlorothiophenol, methallylchloride, benzyl chloride, chlorobenzyl chloride, chloroacetic acid, dichloroacetic acid, trichloroacetic acid, chlorosuccinic acid, oxalyl dichloride, triglycol dichloride, methanesulfonyl chloride, chlorobenzoic acid, chlorosalicylic acid, 4,5-dichlorophthalic acid, 3,5-dichlorosalicylic acid, isopropyl chloride, allyl chloride, epichlorohydrin, chloromethylthiirane, propylene chlorohydrin, chloranil, dichlorodicyanobenzoquinone, dichlorophene, dichloro-1,4-benzoquinone, dichlorobenzophenone, N-chlorophthalimide, 1,3-dichloro-2-propanol, methyl 2,3-dichloro propionate, p-chlorobenzenesulfonic acid, ethyl 2-chloropropionate, dichloromethane, chloroform, and carbon tetrachloride; and acid chlorides such as benzoyl chloride, phthaloyl chloride, isophthaloyl chloride, terephthaloyl chloride, methacryloyl chloride, succinyl chloride, fumaloyl chloride, nicotinoyl chloride, chloronicotinoyl chloride, oleoyl chloride, benzoyl chloride, chlorobenzoyl chloride, and propionyl chloride.

Compounds derived from the halides recited above by replacing a part or all of chlorine with at least one of fluorine, bromine and iodine are also usable as the polymerization regulator.

These polymerization regulators may be used alone or in combination of two or more. Of the recited compounds, preferred are halides of silicon, germanium, tin, or antimony, with chlorides of silicon, germanium, tin, or antimony being more preferred, alkyl-containing chlorides of germanium, tin, or antimony being still more preferred, and dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium, and triphenylantimony dichloride being particularly preferred.

The amount of the polymerization regulator to be used is preferably from 0.001 to 5 parts by weight, more preferably from 0.002 to 5 parts by weight, and still more preferably from 0.005 to 3 parts by weight, each based on 100 parts by weight in total of the inorganic compound A and the compound B.

To improve performances such as oxidation resistance, weatherability, dyeability, strength and refractive index, the polymerization for curing can be carried out in the presence of a compound (performance improver) which is capable of reacting with a part or all of the inorganic compound A, the compound B and the compound C.

Examples of the performance improver include compounds having two or more SH groups, epoxy compounds, iso(thio)cyanates, carboxylic acids, carboxylic anhydrides, phenols, amines, vinyl compounds, allyl compounds, acrylic compounds, and methacrylic compounds. Representative examples thereof are recited below.

(1) Compounds Having Two or More SH Groups:

bis(2-mercaptoethyl)sulfide, bis(2,3-dimercaptopropyl)sulfide, 1,2-bis(2-mercaptoethylthio)ethane, 2-(2-mercaptoethylthio)-1,3-dimercaptopropane, 1,2-bis(2-mercaptoethylthio)-3-mercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,1'-dimercapto-3,6,9-trithiaundecane, 4,7-bis(mercaptomethyl)-1,1'-dimercapto-3,6,9-trithiaundecane, 5,7-bis(mercaptomethyl)-1,1'-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiamidecane, tetrakis(4-mercapto-2-thiabutyl)methane, tetrakis(7-mercapto-2,5-dithiaheptyl)methane, 1,5-dimercapto-3-mercaptomethylthio-2,4-dithiapentane, 3,7-bis(mercaptomethylthio)-1,9-dimercapto-2,4,6,8-tetrathianonane, 2,5-bis(mercaptomethyl)-1,4-dithiane, 2,5-bis(2-mercaptoethyl)-1,4-dithiane, 2,5-bis(mercaptomethyl)-1-thiane, 2,5-bis(2-mercaptoethyl)-1-thiane, bis(4-mercaptophenyl)sulfide, bis(4-mercaptomethylphenyl)sulfide, and 3,4-thiophenedithiol.

(2) Epoxy Compounds:

monoepoxy compounds such as ethylene oxide and propylene oxide;

phenol-based epoxy compounds produced by the condensation of epihalohydrin with a polyphenol compound such as hydroquinone, catechol, resorcinol, bisphenol A, bisphenol F, bisphenol ether, halogenated bisphenol A, and novolak resin;

alcohol-based epoxy compounds produced by the condensation of epihalohydrin with alcohol such as methanol, ethanol, propanol, butanol, ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane, pentaerithritol, 1,3- or 1,4-cyclohexanediol, 1,3- or 1,4-cyclohexanedimethanol, hydrogenated bisphenol A, adducts of bisphenol A and ethylene oxide, and adducts of bisphenol A and propylene oxide;

urethane-based epoxy compounds produced by the reaction of diisocyanate with the alcohol or phenol compound recited above;

glycidyl ester-based epoxy compounds produced by the condensation of epihalohydrin with a carboxylic acid such as acetic acid, propionic acid, benzoic acid, adipic acid, sebacic acid, dodecanedicarboxylic acid, dimer acid, phthalic acid, isophthalic acid, terephthalic acid, tetrahydrophthalic acid, methyltetrahydrophthalic acid, hexahydrophthalic acid, HET acid, nadic acid, maleic acid, succinic acid, fumaric acid, trimellitic acid, benzenetetracarboxylic acid, benzophenonetetracarboxylic acid, naphthalenedicarboxylic acid, diphenyldicarboxylic acid, acrylic acid, methacrylic acid, maleic acid, and fumaric acid;

amine-based epoxy compounds produced by the condensation of epihalohydrin with amine such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl)ether, 1,2-bis(3-aminopropoxy)ethane, 1,3-bis(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperazine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenyl ether, 2,2-(4,4'-diaminodiphenyl)propane, N,N'-dimethylethylene diamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylene diamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- or 2,6-dimethylpiperazine, homo piperazine, 1,1-di(4-piperidyl)-methane, 1,2-di(4-piperidyl)-ethane, 1,3-di(4-piperidyl)-propane, and 1,4-di(4-piperidyl)-butane;

sulfur-containing epoxy compounds such as bis(β-epoxypropyl)sulfide, bis(β-epoxypropyl)disulfide, bis(β-epoxypropylthio)methane, bis(β-epoxypropyldithio)methane, 1,2-bis(β-epoxypropylthio)ethane, 1,3-bis(β-epoxypropylthio)propane, 1,2-bis(β-epoxypropylthio)propane, 1-(β-epoxypropylthio)-2-(β-epoxypropylthiomethyl)propane, 1,4-bis(β-epoxypropylthio)butane, 1,3-bis(β-epoxypropylthio)butane, 1-(β-epoxypropylthio)-3-(β-epoxypropylthiomethyl)butane, 1,5-bis(β-epoxypropylthio)pentane, 1-(β-epoxypropylthio)-4-(β-epoxypropylthiomethyl)pentane, 1,6-bis(β-epoxypropylthio)hexane, 1-(β-epoxypropylthio)-5-(β-epoxypropylthiomethyl)hexane, 1-(β-epoxypropylthio)-2-[(2-β-epoxypropylthioethyl)thio]ethane, 1-(β-epoxypropylthio)-2-[[2-(2-β-epoxypropylthioethyl)thioethyl]thio]ethane, tetrakis(β-epoxypropylthiomethyl)methane, 1,1,1-tris(β-epoxypropylthiomethyl)propane, 1,5-bis(β-epoxypropylthio)-2-(β-epoxypropylthiomethyl)-3-thiapentane, 1,5-bis(β-epoxypropylthio)-2,4-bis(β-epoxypropylthiomethyl)-3-thiapentane, 1-(β-epoxypropylthio)-2,2-bis(β-epoxypropylthiomethyl)-4-thiahexane, 1,5,6-tris(β-epoxypropylthio)-4-(β-epoxypropylthiomethyl)-3-thiahexane, 1,8-bis(β-epoxypropylthio)-4-(β-epoxypropylthiomethyl)-3,6-dithiaoctane, 1,8-bis(β-epoxypropylthio)-4,5-bis(β-epoxypropylthiomethyl)-3,6-dithiaoctane, 1,8-bis(β-epoxypropylthio)-4,4-bis(β-epoxypropylthiomethyl)-3,6-dithiaoctane, 1,8-bis(β-epoxypropylthio)-2,4,5-tris(β-epoxypropylthiomethyl)-3,6-dithiaoctane, 1,8-bis(β-epoxypropylthio)-2,5-bis(β-epoxypropylthiomethyl)-3,6-dithiaoctane, 1,9-bis(β-epoxypropylthio)-5-(β-epoxypropylthiomethyl)-5-[(2-β-epoxypropylthioethyl)thiomethyl]-3,7-dithianonane, 1,10-bis(β-epoxypropylthio)-5,6-bis[(2-β-epoxypropylthioethyl)thio]-3,6,9-trithiadecane, 1,11-bis(β-epoxypropylthio)-4,8-bis(β-epoxypropylthiomethyl)-3,6,9-trithiaundecane, 1,11-bis(β-epoxypropylthio)-5,7-bis(β-epoxypropylthiomethyl)-3,6,9-trithiaundecane, 1,11-bis(β-epoxypropylthio)-5,7-[(2-β-epoxypropylthioethyl)thiomethyl]-3,6,9-trithiaundecane, 1,11-bis(β-epoxypropylthio)-4,7-bis(β-epoxypropylthiomethyl)-3,6,9-trithiaundecane, 1, 3 or 1,4-bis(β-epoxypropylthio)cyclohexane, 1, 3 or 1,4-bis(β-epoxypropylthiomethyl)cyclohexane, bis[4-(β-epoxypropylthio)cyclohexyl]methane, 2,2-bis[4-(β-epoxypropylthio)cyclohexyl]propane, bis[4-(β-epoxypropylthio)cyclohexyl]sulfide, 2,5-bis(β-epoxypropylthiomethyl)-1,4-dithiane, 2,5-bis(β-epoxypropylthioethylthiomethyl)-1,4-dithiane, 1, 3 or 1,4-bis(β-epoxypropylthio)benzene, 1, 3 or 1,4-bis(β-epoxypropylthiomethyl)benzene, bis[4-(β-epoxypropylthio)phenyl]methane, 2,2-bis[4-(β-epoxypropylthio)phenyl]propane, bis[4-(β-epoxypropylthio)phenyl]sulfide, bis[4-(β-epoxypropylthio)phenyl]sulfone, and 4,4'-bis(β-epoxypropylthio)biphenyl;

alicyclic epoxy compounds such as 3,4-epoxycyclohexyl-3,4-epoxycyclohexanecarboxylate, vinylcyclohexane dioxide, 2-(3,4-epoxycyclohexyl)-5,5-spiro-3,4-epoxycyclohexane-m-dioxane, and bis(3,4-epoxycyclohexyl)adipate;

epoxy compounds produced by the epoxydization of unsaturated compounds such as cyclopentadiene epoxide, epoxidized soybean oil, epoxidized polybutadiene, and vinylcyclohexene epoxide; and epoxy compounds having unsaturated group such as vinylphenyl glycidyl ether, vinylbenzyl glycidyl ether, glycidyl methacrylate, glycidyl acrylate, and allyl glycidyl ether.

(3) Iso(thio)cyanates:

monoisocyanates such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate, and tolyl isocyanate;

polyisocyanates such as diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,5-bis(isocyanatomethyl)norbornene, 2,6-bis(isocyanatomethyl)decahydronaphthalene, 2,5-diisocyanato-1,4-dithiane, 2,5-bis(isocyanatomethyl)-1,4-dithiane, 2,6-bis(isocyanatomethyl)-1,4-dithiane, lysine triisocyanate, 2,4-tolylene diisocyanate, 2,6-tolylene diisocyanate, o-tolidine diisocyanate, 4,4'-diphenylmethane diisocyanate, diphenyl ether diisocyanate, 3-(2'-isocyanatocyclohexyl)propyl isocyanate, tris(phenyl)socyanato) thiophophate, isopropylidene bis(cyclohexyl isocyanate), 2,2'-bis(4-isocyanatophenyl)propane, triphenylmethane triisocyanate, bis(diisocyanatotolyl)phenylmethane, 4,4',4''-triisocyanato-2,5-dimethoxyphenylamine, 3,3'-dimethoxybenzidine 4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanato, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanato-1-methylethyl)benzene, 1,4-bis(1-isocyanato-1-methylethyl)benzene, 1,3-bis(2-isocyanato-2-propyl)benzene, 2,6-bis(isocyanatomethyl)naphthalene, 1,5-naphthalene diisocyanate, bis(isocyanatomethyl)tetrahydrodicyclopentadiene, bis(isocyanatomethyl)dicyclopentadiene, bis(isocyanatomethyl)tetrahydrothiophene, bis(isocyanatomethyl)thiophene, 2,5-diisocyanatomethylnorbornene, bis(isocyanatomethyl)

adamantane, 3,4-diisocyanatoselenophane, 2,6-diisocyanato-9-selenabicyclononane, bis(isocyanatomethyl)selenophane, 3,4-diisocyanato-2,5-diselenorane, dimer acid diisocyanate, and 1,3,5-tri(1-isocyanatohexyl)isocyanuric acid;

dimers produced by the biuret reaction of the polyisocyanates recited above;

cyclic trimers of the polyisocyanates recited above;

adducts of the polyisocyanates recited above with alcohol or thiol; and isothiocyanates derived from the compounds recited above by replacing a part or all of isocyanato group with isothiocyanato group.

(4) Carboxylic Acids:

carboxylic acids mentioned in the recitation of the epoxy compounds (1).

(5) Carboxylic Anhydrides:

anhydrides of the carboxylic acids mentioned above.

(6) Phenols:

phenols mentioned in the recitation of the epoxy compounds (1).

(7) Amines:

amines mentioned in the recitation of the epoxy compounds (1).

(8) Vinyl Compounds:

vinyl ether, ethyl vinyl ether, isobutyl vinyl ether, 2-ethylhexyl vinyl ether, phenyl vinyl ether, benzyl vinyl ether, 2-chloroethyl vinyl ether, cyclohexyl vinyl ether, vinyl glycidyl ether, vinyl alcohol, methylvinylcarbinol, ethylene glycol monovinyl ether, ethylene glycol divinyl ether, diethylene glycol monovinyl ether, diethylene glycol divinyl ether, tetramethylene glycol monovinyl ether, divinyl sulfide, vinyl ethyl sulfide, vinyl phenyl sulfide, methyl vinyl ketone, divinyl dicarbonate, vinyl diglycol carbonate, vinylene carbonate, vinyl acetate, vinyl chloroacetate, vinyl propionate, vinyl butyrate, vinyl hexanoate, vinyl 2-ethylhexanoate, divinyl adipate, vinyl benzoate, vinyl salicylate, vinyl acrylate, vinyl methacrylate, vinyl bromide, vinyl iodide, vinyl phosphate, vinylurea, styrene, 2-methylstyrene, 3-methylstyrene, 4-methylstyrene, α-methylstyrene, 2,4,6-trimethylstyrene, 4-t-butylstyrene, stilbene, vinylphenol, 3-vinylbenzyl alcohol, 4-vinylbenzyl alcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinyl phthalate, 2-chlorostyrene, 3-chlorostyrene, 4-chlorostyrene, 3-chloromethylstyrene, 4-chloromethylstyrene, 4-aminostyrene, 3-cyanomethylstyrene, 4-cyanomethylstyrene, 4-vinylbiphenyl, 2,2'-divinylbiphenyl, 4,4'-divinylbiphenyl, 2,2'-distyryl ether, 4,4'-distyryl ether, 2,2'-distyryl sulfide, 4,4'-distyryl sulfide, 2,2-bis(4-vinylphenyl)propane, bis(4-vinylphenyl)ether, and 2,2-bis(4-vinyloxyphenyl)propane.

(9) Allyl Compounds:

compounds derived from the vinyl compounds (8) mentioned above by replacing a part or all of vinyl group with allyl group.

(10) Acrylic Compounds:

methyl acrylate, ethyl acrylate, propyl acrylate, butyl acrylate, cyclohexyl acrylate, 2-hydroxyethyl acrylate, 3-hydroxypropyl acrylate, 2-hydroxypropyl acrylate, 3-phenoxy-2-hydroxypropyl acrylate, trimethylolpropane monoacrylate, 2-hydroxyethyl isocyanurate monoacrylate, 2-hydroxyethyl isocyanurate diacrylate, 2-hydroxyethyl cyanurate monoacrylate, 2-hydroxyethyl cyanurate diacrylate, ethylene glycol diacrylate, diethylene glycol diacrylate, 1,3-butylene glycol diacrylate, triethylene glycol diacrylate, polyethylene glycol diacrylate, propylene glycol diacrylate, 1,3-propanediol diacrylate, 1,3-butanediol diacrylate, 1,4-butanediol diacrylate, 1,6-hexanediol diacrylate, neopentylglycol diacrylate, polypropylene glycol diacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydroxy-3-acryloxypropoxy)phenyl]propane, 2,2-bis[4-(acryloxy.diethoxy)phenyl]propane, 2,2-bis[4-(acryloxy.polyethoxy)phenyl]propane, trimethylolpropane triacrylate, pentaerythritol monoacrylate, pentaerythritol diacrylate, pentaerythritol triacrylate, pentaerythritol tetraacrylate, pentaacrylate of bis(2,2,2-trimethylolethyl)ether, hexaacrylate of bis(2,2,2-trimethylolethyl)ether, and bis(4-acryloylthiophenyl)sulfide.

(11) Methacrylic Compounds:

compounds derived from the acrylic compounds (9) mentioned above by replacing a part or all of acryloyl group with methacryloyl group.

To enhance the practical utility of the resulting optical materials, the polymerization for curing the curable composition can be carried out in the presence of known additives such as antioxidant, blueing agent, ultraviolet absorber and deodorant. If the curable composition being polymerized is easily peeled from the mold, it is effective to improve the adhesion between the mold and the curable composition being polymerized by adding a known external and/or internal adhesion improver. If the cured product is hardly released from the mold, it is effective to improve the releasability of the cured product from the mold by adding a known external and/or internal mold release agent.

The curable composition of the invention is produced, for example, by the following method. The inorganic compound A and the compound B are prepolymerized in a manner described above, and then, the prepolymerization product is mixed with the compound C and optionally with the catalyst for polymerization, the polymerization regulator, the performance improver and other additives such as adhesion improver, mold release agent, antioxidant, blueing agent, ultraviolet absorber, and deodorant. The prepolymerization may be performed in the presence of the compound C, the catalyst for polymerization, the polymerization regulator, the performance improver, and other additives. All of the inorganic compound A, the compound B, the compound C and other optional components may be simultaneously mixed in the same container, or mixed by adding the components stepwise. Alternatively, different combinations of components are separately mixed in different containers, and then, mixed in the same container together. The components may be mixed in any order.

The mixing temperature and mixing time are not limited as far as the components can be mixed sufficiently. However, an excessively high temperature and an excessively long period of mixing are not preferred, because an unfavorable reaction between the components occurs and the viscosity is increased to make the casting operation difficult. The mixing temperature is preferably from −50 to 100° C., more preferably from −30 to 70° C., and still more preferably from −5 to 50° C. The mixing time is preferably from 1 min to 12 h, more preferably from 5 min to 10 h, and still more preferably from 5 min to 6 h. The mixing is performed, if necessary, under shielding of active energy rays. After the mixing, the composition is deaerated in the manner described above. It is preferred to purify the curable composition just before the casting into a mold by filtration to remove impurities, because the quality of resultant optical materials is more enhanced. The pore size of filter is from about 0.05 to 10 μm, and filters having a pore size from 0.1 to 1.0 μm are generally used. Filters made of PTFE, PET, PP, etc. are preferably used. If the filtration is omitted or the pore size of filter exceeds 10 μm, the cured product may become unsuitable for use as optical materials because of inclusion of impurities and reduction of transparency.

The curable composition thus prepared is cast into a mold made of glass or metal, and then, cured by polymerization in a known manner using an electric furnace or an active energy ray generator. The polymerization time is preferably from 0.1 to 100 h, and more preferably from 1 to 48 h. The polymerization temperature is preferably from −10 to 160° C., and more preferably from −10 to 140° C. The polymerization is performed by maintaining the temperature at a given level for a given period of time, raising the temperature at a rate of 0.1 to 100° C./h, lowering the temperature at a rate of 0.1 to 100° C./h, or combining these operations. To remove the strain of cured products, it is preferred to anneal the cured products after the polymerization at 50 to 150° C. for 5 min to 5 h. If necessary, the surface may be treated for dyeing, hard coating, reflection prevention, fog resistance, stain resistance, impact resistance, etc.

The refractive index of the optical material obtainable as described above is preferably 1.72 or more, more preferably 1.73 or more, still more preferably 1.74 or more, and particularly preferably 1.75 or more. The higher the refractive index, the effect of the present invention becomes more striking.

EXAMPLES

The present invention will be described in more detail with reference to the following examples which should not be construed to limit the scope of the present invention thereto. The viscosity of compositions, and the refractive index, Abbe number, heat resistance and color tone of cured products were measured by the following methods.

(1) Viscosity

Using a B-type viscometer, measured at 20° C. immediately after the deaeration and after 3 h of the deaeration, or measured at 30° C. immediately after the deaeration and after 0.5 h, 1 h, 2 h and 3 h of the deaeration. Generally, the cast polymerization can be easily operated when the viscosity is 150 mPa·s or lower. If exceeding 150 mPa·s, the operation (filtration) of cast polymerization becomes difficult, and becomes impossible if exceeding 400 mPa·s.

(2) Refractive Index and Abbe Number

Measured at 20° C. using Abbe refractometer.

(3) Heat Resistance

Using a thermomechanical analyzer (TMA), a sample of 3 mm thick was measured for its softening temperature by allowing a pin having a 1 mm φ tip to penetrate into the sample under a load of 10 g while raising the temperature from 30° C. at a rate of 10° C./min. The softening temperature is preferably 50° C. or higher, and more preferably 70° C. or higher. If less than 30° C., the cured product is not applicable to lenses.

(4) Color Tone

Using a colorimeter, a flat plate of 2.5 mm thick was measured for its yellowness index (YI value). The yellowness of cured product increased with increasing YI value. Therefore, YI value is preferably 5 or less, and more preferably 3 or less. If more than 10, the cured product is not applicable to lenses.

Example 1

First, 20 parts by weight of sulfur (A1) as the inorganic compound A and 80 parts by weight of bis(β-epithiopropyl) sulfide (B1) as the compound B were stirred into a uniform mixture at 65° C. Into the uniform mixture, 0.5 part by weight of 2-mercapto-1-methylimidazole (catalyst for prepolymerization) was added, and the prepolymerization was allowed to proceed at 60° C. for about one hour until the refractive index (20° C.) of the reaction system reached 1.679. After cooling to 20° C., the obtained mixture was added and uniformly mixed with a solution dissolving 5 parts by weight of benzyl mercaptan (C1) as the compound C, 0.03 part by weight of triethylbenzylammonium chloride (catalyst for polymerization) and 0.2 part by weight of di-n-butyltin dichloride (polymerization regulator). The curable composition thus obtained was deaerated under 10 torr for 10 min at 20° C. The deaerated curable composition was filtered through a 0.5 μm PTFE membrane filter and then cast into a 2.5-mm thick flat mold composed of two glass plates and a gasket. The curable composition was cured by polymerization by heating at 30° C. for 10 h, then raising the temperature from 30° C. to 100° C. over 10 h at a constant rate, and finally heating at 100° C. for one hour. After cooling to room temperature by standing, the cured product (optical material) was released from the mold. The results of evaluations are shown in Table 1.

Examples 2-3

The procedure of Example 1 was repeated except for changing the amount of the compound C (C1). The results of evaluations are shown in Table 1.

Examples 4-9

The procedure of Example 1 was repeated except for changing the kind of the compound C. The results of evaluations are shown in Table 1.

Comparative Example 1

The procedure of Example 1 was repeated except for omitting the use of the compound C. The results of evaluations are shown in Table 1. The viscosities of the curable composition immediately after the deaeration and after 3 h of the deaeration were high, because the compound C was not used. Since the viscosity after 3 h of the deaeration was extremely high, the curable composition could not be filtered. The resultant cured product (lens) was remarkably discolored to yellow (high YI value), making it inapplicable to practical uses.

Comparative Example 2

The procedure of Example 1 was repeated except for using 5 parts by weight of bis(2-mercaptoethyl)sulfide (O1) having two SH groups in place of C1. The results of evaluations are shown in Table 1. The viscosities of the curable composition immediately after the deaeration and after 3 h of the deaeration were high, because the compound C was not used. Since the viscosity after 3 h of the deaeration was extremely high, the curable composition could not be filtered.

Comparative Example 3

The procedure of Example 1 was repeated except for using 7 parts by weight of O1 in place of C1. The results of evaluations are shown in Table 1. The viscosities of the curable composition immediately after the deaeration and after 3 h of the deaeration were high, because the compound C was not used. Since the viscosity after 3 h of the deaeration was extremely high, the curable composition could not be filtered.

TABLE 1

| | Composition (parts by weight) | | | |
|---|---|---|---|---|
| | Inorganic compound A | Compound B | Compound C | Another compound |
| Examples | | | | |
| 1 | A1: 20 | B1: 80 | C1: 5 | — |
| 2 | A1: 20 | B1: 80 | C1: 6 | — |
| 3 | A1: 20 | B1: 80 | C1: 7 | — |
| 4 | A1: 20 | B1: 80 | C2: 5 | — |
| 5 | A1: 20 | B1: 80 | C3: 5 | — |
| 6 | A1: 20 | B1: 80 | C4: 5 | — |
| 7 | A1: 20 | B1: 80 | C5: 5 | — |
| 8 | A1: 20 | B1: 80 | C6: 5 | — |
| 9 | A1: 20 | B1: 80 | C7: 5 | — |
| Comparative Examples | | | | |
| 1 | A1: 20 | B1: 80 | — | — |
| 2 | A1: 20 | B1: 80 | — | O1: 5 |
| 3 | A1: 20 | B1: 80 | — | O1: 7 |

| | Viscosity (mPa·s) | | Refractive index $n_e$ | Abbe number $v_d$ | Heat resistance (°C.) | Color tone (YI) |
|---|---|---|---|---|---|---|
| | immediately after | 3 h after | | | | |
| Examples | | | | | | |
| 1 | 90 | 90 | 1.75 | 31 | 76 | 2.1 |
| 2 | 85 | 80 | 1.75 | 31 | 74 | 2.1 |
| 3 | 80 | 75 | 1.74 | 32 | 72 | 2.0 |
| 4 | 80 | 85 | 1.75 | 31 | 78 | 2.1 |
| 5 | 75 | 80 | 1.75 | 31 | 78 | 2.0 |
| 6 | 80 | 85 | 1.75 | 31 | 76 | 2.1 |
| 7 | 80 | 85 | 1.74 | 32 | 76 | 2.0 |
| 8 | 85 | 80 | 1.74 | 33 | 70 | 2.1 |
| 9 | 85 | 95 | 1.74 | 33 | 78 | 2.0 |
| Comparative Examples | | | | | | |
| 1 | 350 | 1200 | 1.75 | 32 | >120 | 11.1 |
| 2 | 220 | 1050 | 1.75 | 31 | 78 | 2.0 |
| 3 | 210 | 1110 | 1.74 | 32 | 72 | 2.0 |

C2: 2-methylthiophenol
C3: 4-methylthiophenol
C4: 4-chlorobenzyl mercaptan
C5: 1-mercaptomethylfuran
C6: 2-mercaptoethanol
C7: cyclohexyl mercaptan Example 10

First, 24 parts by weight of sulfur (A1) as the inorganic compound A, 76 parts by weight of bis(β-epithiopropyl)sulfide (B1) as the compound B and 5 parts by weight of diphenyl disulfide (C8) as the compound C were stirred into a uniform mixture at 65° C. Into the uniform mixture, 0.5 part by weight of 2-mercapto-1-methylimidazole (catalyst for prepolymerization) was added, and the prepolymerization was allowed to proceed at 60° C. for about one hour until the refractive index (20° C.) of the reaction system reached 1.689. After cooling to 30° C., the obtained mixture was added and uniformly mixed with a solution dissolving 0.03 part by weight of triethylbenzylammonium chloride (catalyst for polymerization), 0.20 part by weight of di-n-butyltin dichloride (polymerization regulator) and 5 parts by weight of bis(2-mercaptoethyl)sulfide (O1). The curable composition thus obtained was deaerated under 10 torr for 10 min at 30° C. The deaerated curable composition was filtered through a 0.5 μm PTFE membrane filter and then cast into a 2.5-mm thick flat mold composed of two glass plates and a gasket. The curable composition was cured by polymerization by heating at 30° C. for 10 h, then raising the temperature from 30° C. to 100° C. over 10 h at a constant rate, and finally heating at 100° C. for one hour. After cooling to room temperature by standing, the cured product (optical material) was released from the mold. The results of evaluations are shown in Table 2. The viscosity was measured immediately after the deaeration and after 0.5 h, 1 h, 2 h and 3 h of the deaeration. The results thereof are shown in FIG. 1.

Example 11

The procedure of Example 10 was repeated except for changing the composition as shown in Table 2. The results of evaluations are shown in Table 2 and FIG. 1.

Comparative Example 4

The procedure of Example 10 was repeated except for omitting the use of the compound C. The results of evaluations are shown in Table 2 and FIG. 1. As shown in FIG. 1, the viscosities of the curable composition immediately after the deaeration and after 3 h of the deaeration were high, because the compound C was not used. Since the viscosity after 3 h of the deaeration was extremely high, the curable composition could not be filtered.

Comparative Example 5

The procedure of Comparative Example 4 was repeated except for changing the composition as shown in Table 2. The results of evaluations are shown in Table 2 and FIG. 1. As shown in FIG. 1, the viscosity of the curable composition immediately after the deaeration was extremely high. The composition changed into a gel with time to make it impossible to measure the viscosity after 3 h of the deaeration.

TABLE 2

| | Composition (parts by weight) | | | |
|---|---|---|---|---|
| | Inorganic compound A | Compound B | Compound C | Another compound |
| Examples | | | | |
| 10 | A1: 24 | B1: 76 | C8: 5 | O1: 5 |
| 11 | A1: 27 | B1: 73 | C8: 7 | O1: 5 |
| Comparative Examples | | | | |
| 4 | A1: 24 | B1: 76 | — | O1: 5 |
| 5 | A1: 27 | B1: 73 | — | O1: 5 |

| | Viscosity (mPa·s) | | Refractive index $n_e$ | Abbe number $v_d$ | Heat resistance (°C.) | Color tone (YI) |
|---|---|---|---|---|---|---|
| | immediately after | 3 h after | | | | |
| Examples | | | | | | |
| 10 | 90 | 160 | 1.75 | 31 | 78 | 2.1 |
| 11 | 110 | 200 | 1.76 | 30 | 75 | 2.9 |
| Comparative Examples | | | | | | |
| 4 | 250 | 39500 | 1.75 | 31 | 78 | 2.0 |
| 5 | 700 | gel | 1.76 | 30 | 79 | 2.9 |

INDUSTRIAL APPLICABILITY

The viscosity of the curable composition of the invention is little increased by the prepolymerization and the deaeration, although it contains an inorganic compound having sulfur atom and/or selenium atom. Therefore, the cast polymerization of the curable composition is easily operated to increase the efficiency of the production of cured products which are applicable to optical materials.

What is claimed is:

1. A composition, which has been prepolymerized and is capable of being subjected to further polymerization, comprising an inorganic compound A having sulfur atom and/or selenium atom, a compound B represented by the following formula 1:

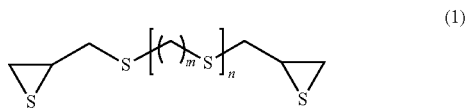

(1)

wherein m is an integer from 0 to 4, and n is an integer from 0 to 2, a compound C having an aromatic ring and selected from the group consisting of disulfide compounds which are other than the compound B and have one or more disulfide linkages, the inorganic compound A being contained in an amount from 1 to 50 parts by weight and the compound B being contained in an amount from 50 to 99 parts by weight when a total of the inorganic compound A and the compound B is taken as 100 parts by weight, and the compound C being contained in an amount from 1 to 10 parts by weight based on 100 parts by weight in total of the inorganic compound A and the compound B, and 2-mercapto-1-methylimidazole as a catalyst for prepolymerization, the inorganic compound A and the compound B having been subjected to the prepolymerization, the composition having been subjected to deaeration after prepolymerization, and further comprising a catalyst for polymerization in an amount from 0.001 to 5.0 parts by weight based on 100 parts by weight in total of the inorganic compound A and the compound B.

2. The composition according to claim 1, wherein the inorganic compound A and the compound B have been prepolymerized at 0 to 150° C. for 1 min to 72 h.

3. The composition according to claim 1, which has been deaerated under a pressure of 0.001 to 50 torr at 0 to 100° C. for 1 min to 24 h.

4. The composition according to claim 1, wherein the inorganic compound A is sulfur.

5. The composition according to claim 1, wherein the compound B is bis(β-epithiopropyl) sulfide and/or bis(β-epithiopropyl) disulfide.

6. The composition according to claim 1, wherein the compound C has a molecular weight of from 150 to 300.

7. The composition according to claim 1, further comprising a polymerization regulator in an amount from 0.001 to 5.0 parts by weight based on 100 parts by weight in total of the inorganic compound A and the compound B.

8. A method of producing an optical material comprising a step of curing the composition as defined in claim 1 by polymerization.

9. An optical material produced by the method according to claim 8.

10. An optical lens comprising the optical material as defined in claim 9.

11. The composition according to claim 1, wherein the amount of compound C contained in the curable composition is 5 to 10 parts by weight based on 100 parts by weight in total of the inorganic compound A and the compound B.

12. The curable composition according to claim 1, wherein the compound C is at least one selected from the group consisting of diphenyl disulfide, di-p-tolyl disulfide, bis(chlorophenyl)disulfide, dinaphthyl disulfide, difurfuryl disulfide and dipyridyl disulfide.

13. The composition according to claim 1, wherein the compound C includes diphenyl disulfide.

14. The curable composition according to claim 2, wherein 10 to 70% by weight of the inorganic compound A which is initially charged has been prepolymerized.

15. The curable composition according to claim 1, wherein said catalyst for prepolymerization is included in an amount of 0.001 to 5 parts by weight based on 100 parts by weight in total of the inorganic compound A and the compound B.

16. A method of producing the composition according to claim 1, comprising prepolymerizing the compound A and the compound B, in the presence of 2-mercapto-1-imidazole as a catalyst for the prepolymerization, to form a resulting prepolymerized composition, and then deaerating the prepolymerized composition.

17. The method of producing the composition according to claim 16, wherein the prepolymerizing is performed in the presence of the compound C.

18. The method of producing the composition according to claim 16, wherein the compound C acts to prevent an increase in viscosity due to the prepolymerizing and the deaerating.

19. The method of producing the composition according to claim 16, wherein said prepolymerizing is conducted at 0 to 150° C. for 1 min to 72hr.

20. The method for producing the composition according to claim 19, wherein said deaerating is performed under a pressure of 0.001 to 50 torr at 0 to 100° C. for 1 min to 24hr.

21. The composition according to claim 1, wherein said prepolymerization has been conducted in the presence of the compound C.

22. The composition according to claim 1, wherein in the prepolymerization the inorganic compound A and the compound B have been prepolymerized.

* * * * *